United States Patent [19]

Olesen

[11] 4,021,034
[45] May 3, 1977

[54] STAND FOR CONVERTING CONVENTIONAL BICYCLE FOR INDOOR EXERCISING

[76] Inventor: Karl Richard Olesen, 15245 Hume Drive, Saratoga, Calif. 95070

[22] Filed: Sept. 4, 1975

[21] Appl. No.: 610,158

[52] U.S. Cl. .................................. 272/73; 211/22
[51] Int. Cl.² .......................................... A63B 69/16
[58] Field of Search ...................... 272/73; 211/22

[56] References Cited
UNITED STATES PATENTS

| | | | |
|---|---|---|---|
| 590,769 | 9/1897 | Pearson | 272/73 |
| 637,398 | 11/1899 | Meuli-Hilty | 272/73 |

Primary Examiner—Richard C. Pinkham
Assistant Examiner—T. Brown
Attorney, Agent, or Firm—Leslie M. Hansen

[57] ABSTRACT

A y-shaped stand having a hook end for engaging the diagonal brace of a bicycle frame and a drive hub support adjacent the crotch of the Y with the legs of the Y diverging to provide two foot pads of a tripod, the front wheel providing the third foot thereof, and straps between each pad and the rear fork of the bicycle stabilizing the bicycle with its rear wheel free to turn for riding in a stationary position by a person on the seat of the bicycle.

10 Claims, 8 Drawing Figures

U.S. Patent    May 3, 1977    4,021,034
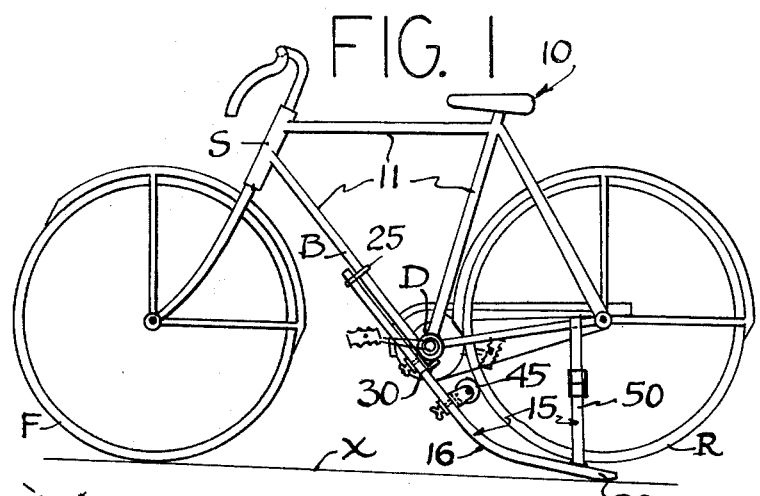
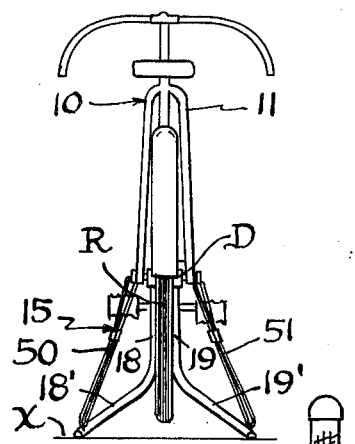
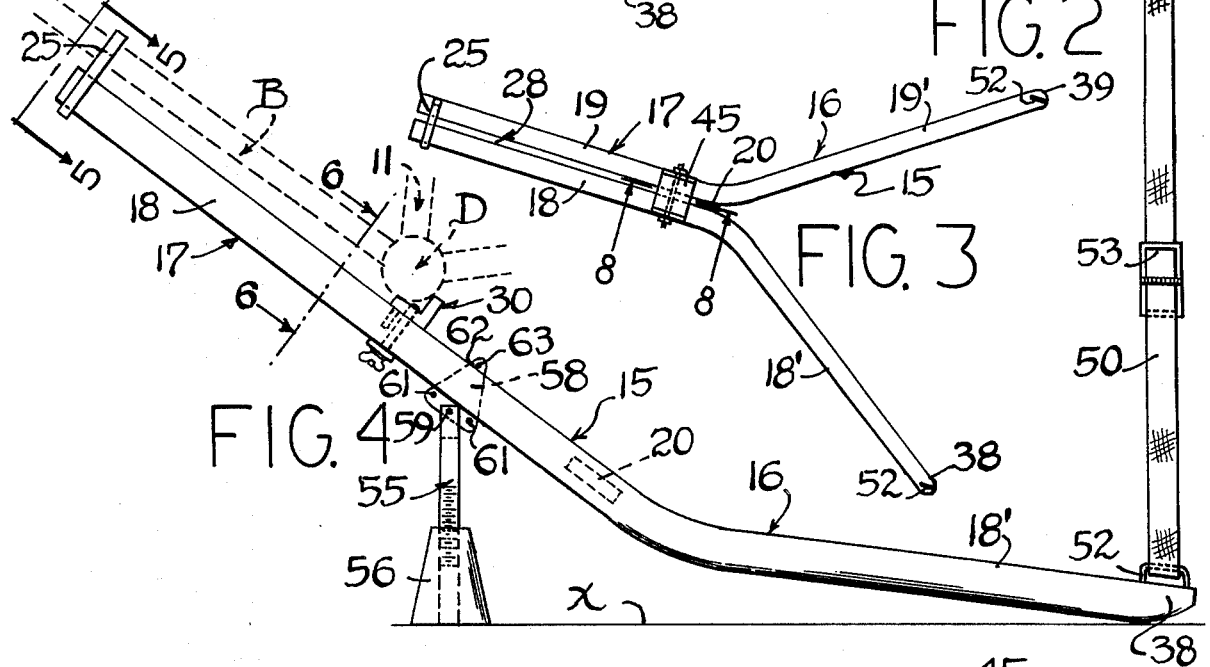
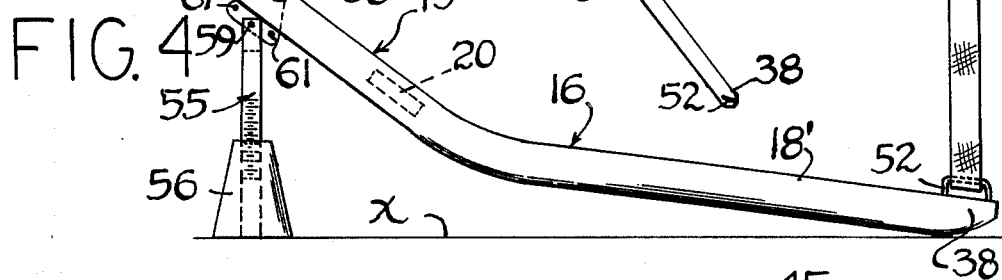
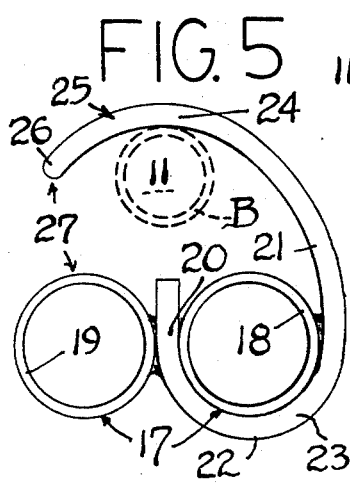
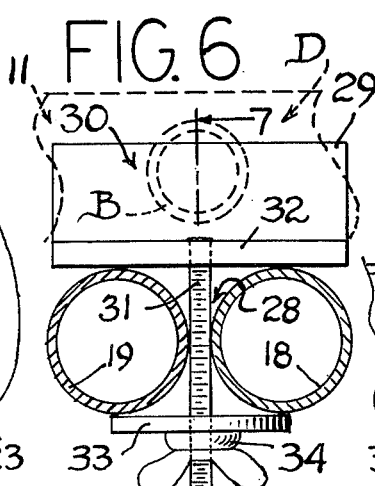
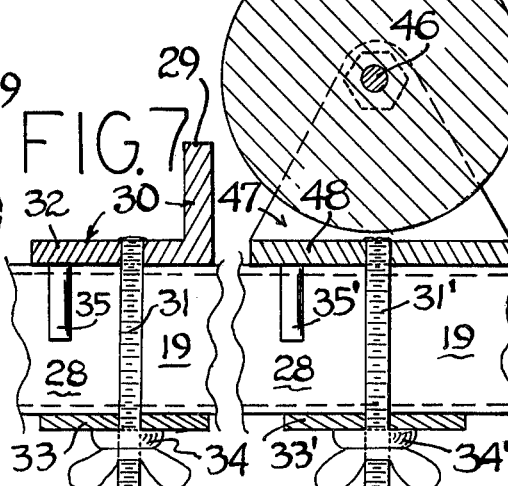
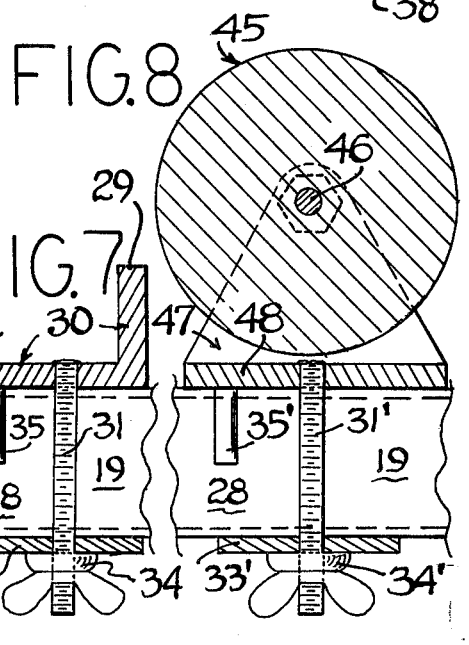

STAND FOR CONVERTING CONVENTIONAL BICYCLE FOR INDOOR EXERCISING

This invention relates to a bicycle stand and more particularly to a stand for converting a conventional bicycle into a stationary exercycle.

BACKGROUND OF THE INVENTION

The use of a conventional bicycle in one's house for exercise is not basically new. The art shows numerous types of stands for supporting a bicycle for operation in a stationary condition. Such prior stands are constructed to be substantially permanently secured to a bicycle. The prior stands require removal of the axle nuts and the mounting of the stands on the axle ends for securing thereto by replacement of the nuts thereon. In most cases, the bicycle cannot be used for riding in a conventional manner without removal of the stands. In cases where they may remain secured and swing out of supporting position to enable conventional riding of the bicycle, the stands are a bulky appendage which can interfere with normal and comfortable riding operation. Moreover, they become an additional load and are unsightly from a standpoint of aesthetics.

THE PRESENT INVENTION

It is an object of the present invention to provide a bicycle stand which may be easily and quickly applied to a conventional bicycle for supporting the latter with a person thereon for the purpose of operating the bicycle in a stationary condition.

It is another object to provide such a bicycle stand, which will safely support the bicycle and person thereon, against sidewise tipping during pedal operation.

It is yet another object to provide a bicycle stand with a simple hook and pad whereby the stand although not permanently attached can be easily engaged with the bicycle frame.

It is still another object to provide a tripode-like support of a bicycle in which the stand provides two spread leg supports at the rear of the bicycle and the front wheel of the latter the third support.

These and other objects and advantages of the present invention will become apparent from a reading of the following description and claims in the light of the accompanying single sheet of drawing in which:

FIG. 1 is a side elevational view of a bicycle supported on a stand embodying the present invention;

FIG. 2 is a rear elevational view of the bicycle and stand of FIG. 1 as seen from the righthand thereof;

FIG. 3 is a plan view of the stand only;

FIG. 4 is a side elevational view of the stand of FIGS. 1 and 3 and at larger scale with respect thereto;

FIG. 5 is an end view of the stand as seen from line 5—5 in FIG. 4, and at larger scale;

FIG. 6 is a section through FIG. 4 taken at line 6—6 therein at larger scale;

FIG. 7 is a section through FIG. 6 taken along line 7—7 therein; and

FIG. 8 is a section through FIG. 3 taken along line 8—8 therein and at larger scale with respect thereto.

GENERAL DESCRIPTION

Referring to FIGS. 1 and 2, a bicycle generally designated 10 has the customary frame 11 having a steering post S at its fore end associated with the handle bars and front fork for steering the front wheel F. It also has a fork extending horizontally rearward from its drive hub D for receiving and supporting the rear wheel R of the bicycle. The frame 11 also has a brace B extending diagonally upward from the drive hub D to the steering post S in accordance with conventional two wheeled bicycle design.

DETAILED DESCRIPTION OF THE INVENTION

The invention has its embodiment in a bicycle stand designated 15 in the drawing. The stand 15 comprises a Y-shaped metal frame 16 having a main body 17 consisting of a pair of members 18 and 19 of identical cross section, preferably tubular, joined together in spaced parallel relation by spacers 20 which may be welded or otherwise secured between members 18 and 19. The fore half of the members 18–19 are parallel to a zone about midway the length of the stand. The other aft halves thereof terminate in diverging legs 18' and 19' respectively, completing the Y-shaped frame 16.

A hook-shaped member 25 is provided at the fore end of the main body 17 (FIGS. 4 and 5). This hook member 25 is preferably, although not necessarily, formed as a part of the separator 20 at the fore end of the body 17 as shown. In other words, the forward portion of the separator 20 may be an integral part 20' of a single strap of metal 21 having one end 20' disposed between and welded or otherwise secured to the members 18 and 19. The remainder 22 of the strap 21 circumscribes the member 18 as at 23 and terminates in an arcuate portion 24 overlying the fore ends of the members 18–19 to provide the hook-shaped member 25 vertically above the latter.

The extreme end 26 of the strap 21 is spaced from the member 19 to leave a gap 27 sufficient to allow passage of a portion B of the frame 11 of the bicycle 10 therethrough.

The space 28 between the parallel members 18 and 19 provides a guideway for receiving certain appendages required to support the bicycle 10. One of these appendages designated a hub support 30 is for the purpose of engaging and supporting the housing of the drive hub D of the bicycle.

The hub support 30 is an angle iron clip 29 secured to the members 18–19 at a position along their length. The angle clip 29 has its flanges disposed to tangently engage the hub D at the bottom and aft segments of the latter. It will here be appreciated that all bicycle frames are not of the same size and dimensions. Consequently, for purposes of the present invention, the hub support 30 is constructed for adjustable attachment to the frame 11 of a bicycle. To this end, the angle clip 29 has one end of a threaded bolt 31 permanently secured to the bottom flange 32 of the clip. The bolt 31 extends downwardly from the flange 32 midway the length of the angle iron clip 29. The bolt 31 is of a diameter to fit through the space 28 provided between the parallel members 18–19 for sliding adjustment lengthwise thereof. The lower threaded end of the bolt 31 extends beyond the members 18–19 to receive a washer 33 wing nut 34. By this arrangement, the clip 29 is releasably secured to the members 18–19. To assure proper positioning of the angle clip 29 with its length transverse to the guideway space 28 and tangent engagement of its flange 32 with both members 18 and 19, a guide post 35 is provided on the bottom flange 32. The guide post 35 also has one of its ends secured to the bottom flange 32 midway its length but in spaced relation to the bolt 31. The guide post 35 extends downward only sufficiently to have tangent engagement with the adjacent side walls of members 18–19 which form the guideway 28. Thus the members 18–19 are clampingly secured between the flange 32 and washer 33 by tightening of the wing nut 34 on the threaded bolt 31.

To apply the stand 15 to a bicycle 10, the bicycle is grasped to raise the rear wheel R off the surface X upon which the front wheel F is resting. The hook-shaped member 25 is then engaged over the diagonal brace B of the bicycle frame 11. The bicycle is then lowered to engage the housing of the drive hub D of the bicycle upon the hub support 30. The extreme ends 38 and 39 of the diverging leg portions 18' and 19' respectively on the main body 17 of the stand 15 provide pads adapted to rest upon the surface X. These pads 38 and 39 on the spread legs 18' and 19' cooperate with the front wheel F to provide a tripod support for supporting the bicycle with its rear wheel R elevated above the surface X. It should here be noted that the diverging leg portions 18'–19' are bowed slightly upwardly just behind the adjacent spacer 20 (the end of the guideway 28) to afford a lowering of the rear wheel of the bicycle to a safer elevation relative to the surface X.

For best results, the end pads 38–39 should be disposed at least directly below the rear axle of the bicycle and preferably slightly to the rear of the axle. This aids in balancing the bicycle against backward tilting when a person is seated thereon for operating the pedals thereof. To assure proper positioning of the tripod pads 38–39 relative to the rear axle of the bicycle, the hub support 30 may be adjusted along the length of the guideway space 28 provided between the parallel members 18–19 of the stand.

The spread of the pads 38–39 on the diverging leg portions 18'–19' and their squatting relation of the latter relative to the surface S provides a relatively stable means for supporting the bicycle in a standing position on a vertical plane (FIGS. 1 and 2). A person seated on the saddle of the bicycle can now pump the pedals thereof and the rear wheel R will turn freely under the influence of the chain and sprocket drive train.

To resist turning of the rear wheel R, i.e., to simulate road conditions, a tensioned roller 45 is provided as accessory to the stand 15. This roller 45 as seen in FIG. 8 is pivotally mounted as at 46 on a U-shaped clevice 47 having its web 48 tangently engaging the parallel members 18 and 19. The tension roller 45 mounted on the members 18–19 in the same manner as is the hub support 30. The mounting means include a threaded bolt 31' extending downwardly from the web 48 through the guide space 28 to receive a washer 33' and wing nut 34'. A guide post 35' also extends downward from a web 48 in spaced relation to the bolt 31' along a plane perpendicular to the axis of the pivotal relation of the roller 45 to the clevice. Here again the manner of mounting the tensioned roller 45 on the stand affords adjustment to assure tractional engagement between the roller and tread of the rear wheel R of the bicycle. Thus a person can obtain the exercise from riding a bicycle in a stationary location such as one's own home, family room, or garage.

Since the pedals of the bicycle extend laterally of the plane of support of the bicycle, some persons may lean heavily with one foot and then the other in pumping the pedals alternately against the tractional resistance afforded by the tensioned roller 45. This may create a tendancy toward a rocking of the bicycle from side to side of its plane of support. To resist such tendancy, a pair of straps 50 and 51 are provided between the extreme ends of the diverging legs 18' and 19'; respectively, and the frame 11 of the bicycle. Each leg 18' and 19' is provided with a loop 52 through which its respective strap is secured, the strap is strung over the rear fork of the bicycle adjacent the rear wheel axle. Each strap has a snubber type buckle 53 for securing each strap to the respective side arm of the rear fork to counteract racking of the stand 15 relative to the bicycle supported thereon.

Should the weight of a person seated on the saddle of the bicycle supported on the stand 15 be such as to cause flexing of the leg members 18'–19' relative to the main body 17 thereof, a strut leg 55 may be secured to the stand. This strut leg 55 comprises a foot pad 56 from which a strut bar 57 extends upwardly to a coupling plate 58. The coupling plate 58 is a flat piece of metal pivotally connected as at 59 to the strut bar 57 and having means 60 for securing the plate 58 to the parallel members 18 and 19 of the main body of the stand 15.

The flat metal plate 58 extends upwardly through the guide space 28 between the parallel members 18–19 for movement lengthwise therebetween. The plate 58 is of triangular form having a pin 61 extending laterally to each of its sides adjacent the corner angles of its base edge and equidistant from the pivotal connection at 59 with the upper end of the strut bar 57. The two pins 61 at the base angles of the plate 58 have tangent engagement with the members 18 and 19 on each side of the plate 58. The apex of the triangular plate 58 has a bore 62 formed through its apex angle to receive a lock bolt 63. As best seen in FIG. 4, the strut bar 57 exerts a thrust vertically upward against the triangular shaped plate 58. This affords a binding action between the pins 61 and lock bolt 63 relative to the accumulated six points of tangent engagement of the three with the two straight members 18 and 19 of the stand. The strut leg 55 is thereby adjustable lengthwise along the guide space 28 between the members 18–19, to support the excess load at the critical location on the stand. For this adjustment, the strut leg 55 may be lengthened or shortened by reason of threaded connection between the foot pad 56 and strut bar 57.

The bicycle stand constructed in accordance with the present invention will give a stable and safe support to a bicycle with a person thereon and operating the pedals thereof to simulate normal riding. The spread pads of the diverging legs being spaced a safe distance to the sides and being strapped to the frame assures stability against rocking and/or tipping of the bicycle under such simulated riding conditions.

While I have described the stand and its accessories in specific detail, it will be appreciated by those skilled in the art that the same may be varied, altered and/or modified without departing from the spirit or scope of my invention therein as called for in the appended claims.

What I claim as new and desire to protect by Letters Patent is:

1. For converting a conventional bicycle of the type having a frame including a drive hub from which a rear wheel supporting fork extends rearwardly and a diagonal brace extends forwardly to a steering post for the front wheel supporting fork, a stand for supporting such a bicycle and a person seated thereon comprising:

1. a main body including a pair of members each having a fore portion adapted to be disposed in parallel relation with each other and an aft portion adapted to extend rearwardly therefrom at an obtuse angle relative to its respective fore portion;
2. means for securing the fore portions of said pair of members in spaced parallel relation to provide a guideway therebetween and a Y-shaped frame in which the angularly disposed aft portions extend rearwardly therefrom as a pair of diverging leg members having foot ends;
3. a hook shaped member secured to the fore ends of the fore portions of said pair of members above the parallel plane thereof for engaging the diagonal brace of a bicycle;
4. a hub support mounted on the spaced parallel fore portions of said members for engaging and supporting the drive hub of a bicycle; and
5. securing means on said hub support extending into the guideway between the spaced parallel fore portions of said pair of members for releasably securing the hub support along the length thereof and in engagement with the drive hub of a bicycle to dispose the Y-shaped frame in a position in which the foot ends of each said diverging aft portions of said pair of members are disposed in spaced relation beneath the rear wheel supporting fork of a bicycle cooperating with the front wheel of such bicycle to support the latter tripod fashion with the rear wheel of such bicycle elevated for free turning operation by a person seated on the bicycle.

2. The stand in accordance with claim 1 in which said hub support comprises:
1. an angle clip having one lower flange adapted to rest upon the fore portions of said pair of members lengthwise across said guideway therebetween and having its other flange extending upwardly therefrom for tangent engagement with the drive hub of a bicycle;
2. a threaded bolt having one end secured to the bottom of said lower flange for extending into and through said guideway; and
3. a means including threaded wing nut on the exposed end of said bolt for clampingly securing said angle clip to said pair of members.

3. The stand in accordance with claim 2 including a guide pin secured to the bottom of the lower flange of said angle clip in spaced relation to said bolt thereon on a plane transverse to the length of said angle clip for extension into said guideway and cooperating with said bolt for maintaining said angle clip in hub supporting position upon said pair of members.

4. The stand in accordance with claim 3 in which said diverging leg members are bowed upwardly at a slight angle at their point of convergence and relative to the parallel portions of said pair of members.

5. The stand in accordance with claim 2 including a tensioned roller comprising:
1. a U-shaped clevice having its web portion adapted to rest upon the spaced parallel fore portions of said pair of members;
2. a tensioned roller mounted on said clevice for turning about an axis transverse to said guideway and tread engagement with the rear wheel of the bicycle supported on said stand; and
3. means extending downwardly from said clevice into said guideway for securing the clevice and tensioned roller to the fore portions of said pair members.

6. The stand in accordance with claim 5 including a strut member secured to said pair of members adjacent the zone of convergence of said leg members therefrom for resisting flexing of the latter due to excessive weight of a person seated on said bicycle.

7. The stand in accordance with claim 6 in which said strut is a threaded jack screw, a threaded base on the lower end of said jack screw; a coupling plate pivotally connected to the 8. The stand in accordance with claim 1 including a means extending between the extreme end of each of said diverging leg members and the rear fork of the bicycle and connected thereto for stabilizing the latter during operation thereof by a person seated thereon.

9. The stand in accordance with claim 8 in which said diverging leg members each have a loop secured thereto above their respective tripod foot ends for receiving said means extending between the latter and the rear fork for connection to said means for stabilizing the bicycle during operation thereof.

10. The stand in accordance with claim 9 in which said means connected to the loop on the end of each leg member comprises a belt having one end secured thereto and its opposite end adapted to extend over and around the respective tine of the rear fork; and a snubber buckle on said strap for said opposite end of said strap for tightening the strap securely between the bicycle frame and the loop on the end of the respective leg member.

* * * * *